United States Patent [19]
Chamberlain et al.

[11] Patent Number: 5,446,270
[45] Date of Patent: Aug. 29, 1995

[54] MICROWAVE HEATABLE COMPOSITES

[75] Inventors: Craig S. Chamberlain; Glen Connell; Pierre H. LePere; Chris A. Minick; Charlotte M. Palmgren; William C. Tait; George F. Vesley; Patrick G. Zimmerman, all of St. Paul, Minn.

[73] Assignee: Minnesota Mining and Manufacturing Company, St. Paul, Minn.

[21] Appl. No.: 180,448

[22] Filed: Jan. 12, 1994

Related U.S. Application Data

[60] Division of Ser. No. 588,591, Sep. 26, 1990, Pat. No. 5,294,763, which is a continuation-in-part of Ser. No. 335,044, Apr. 7, 1989, abandoned.

[51] Int. Cl.⁶ .............................................. H05B 6/80
[52] U.S. Cl. ................................. 219/730; 219/759; 426/107; 426/234; 427/218; 427/221; 428/403
[58] Field of Search ............... 219/730, 731, 729, 759; 99/DIG. 14; 426/103, 113, 234, 243; 428/49, 209, 403, 408, 407; 427/221, 218, 125, 217, 229, 279, 457, 516, 215, 219

[56] References Cited

U.S. PATENT DOCUMENTS

| | | | |
|---|---|---|---|
| 2,830,162 | 4/1958 | Copson et al. | 219/730 |
| 3,585,258 | 6/1971 | Levinson | 219/756 |
| 3,701,872 | 10/1972 | Levinson | 219/759 |
| 3,853,612 | 12/1974 | Spanoudis | 219/728 |
| 4,025,159 | 5/1977 | McGrath | 359/514 |
| 4,057,702 | 11/1977 | Lacombe-Allard | 219/701 |
| 4,190,757 | 2/1980 | Turpin et al. | 219/730 |
| 4,218,507 | 8/1980 | Deffeyes et al. | 428/403 |
| 4,230,924 | 10/1980 | Brastad et al. | 219/730 |
| 4,266,108 | 5/1981 | Anderson et al. | 219/730 |
| 4,267,420 | 5/1981 | Brastad | 219/730 |
| 4,362,917 | 12/1982 | Freedman et al. | 219/730 |
| 4,438,179 | 3/1984 | Solc | 428/407 |
| 4,450,334 | 5/1984 | Bowen et al. | 219/730 |
| 4,454,403 | 6/1984 | Teich et al. | 219/729 |
| 4,518,651 | 5/1985 | Wolfe, Jr. | 99/DIG. 14 |
| 4,542,271 | 9/1985 | Tanonis et al. | 219/730 |
| 4,544,600 | 10/1985 | Kern | 427/221 |
| 4,612,242 | 9/1986 | Vesley et al. | 428/313.9 |
| 4,618,525 | 10/1986 | Chamberlain et al. | 428/209 |
| 4,623,565 | 11/1986 | Huybrechts et al. | 219/725 |
| 4,640,838 | 2/1987 | Isakson et al. | 426/107 |
| 4,641,005 | 2/1987 | Seiferth | 219/730 |
| 4,721,738 | 1/1988 | Ellis et al. | 523/137 |
| 4,800,247 | 1/1989 | Schneider et al. | 219/730 |
| 4,808,780 | 2/1989 | Seaborne | 219/730 |
| 4,810,829 | 3/1989 | Rutenbeck et al. | 174/41 |
| 4,852,453 | 8/1989 | Morin | 428/408 |
| 4,906,497 | 3/1990 | Hellmann et al. | 428/49 |
| 5,021,293 | 6/1991 | Huang et al. | 219/730 |
| 5,294,763 | 3/1994 | Chamberlain et al. | 219/729 |

*Primary Examiner*—Tu Hoang
*Attorney, Agent, or Firm*—Gary L. Griswold; Walter N. Kirn; Carole Truesdale

[57] ABSTRACT

Composition comprising (a) susceptors having the capability of absorbing microwave energy, said susceptors comprising a particulate substrate substantially non-reflective of microwave energy and a coating capable of absorbing microwave energy, and (b) a matrix substantially non-reflective of microwave energy. Susceptors are typically particles having a thin-film coating thereon. The matrix typically comprises polymeric or ceramic materials that are stable at temperatures conventionally used in microwave cooking. The composition allows reuse of the susceptors, eliminates decline in heating rate, eliminates arcing, allows the heating rate to be controlled, allows overheating to be controlled, and allows formation of microwave heatable composite materials having very low metal content.

9 Claims, 1 Drawing Sheet

MICROWAVE HEATABLE COMPOSITES

This application is a division of application Ser. No. 07/588,591 filed Sep. 26, 1990, U.S. Pat. No. 5,284,803, which is a continuation-in-part of U.S. application Ser. No. 07/335,044, filed Apr. 7, 1989, now abandoned.

Background of the Invention

1. Field of the Invention

This invention relates to articles capable of being heated by microwave energy.

2. Discussion of the Prior Art

The use of microwave radiation to generate heat in materials is becoming increasingly more prevalent in both consumer applications and in industrial applications because of the increased speed and lower power consumption of microwave processes, when contrasted with conventional heating processes. Microwave susceptors are materials that absorb microwave energy, convert the absorbed energy to heat energy, and thereby heat surrounding media. Two general categories of susceptors are: (1) thin-film susceptors; and (2) particulate susceptors.

Thin-film susceptors typically comprise a metal coated polyester film laminated to a substrate such as paper or cardboard. The substrate serves to increase the dimensional stability of the susceptor during use in a microwave oven. The use of such susceptors is well known in the art and is described in a number of patents, such as, for example, U.S. Pat. Nos. 4,267,420; 4,230,924; and 4,641,005; and Canadian Patent No. 1,153,069. One example of a thin-film susceptor involves the application of electrically resistive films to the surface of an article (e.g., a dish) to convert microwave energy to heat by means of so-called $I^2R$ or resistive loss (see, for example, U.S. Pat. No. 3,853,612). The disadvantages associated with conventional thin-film susceptors include rapid decline in heat output of the susceptor (prohibiting reuse of susceptors), arcing, difficulty in regulating heating rate, and the necessity of a separate processing step to laminate the film onto a substrate.

Particulate susceptors can be conveniently classified into two groups, namely electrically continuous particulate susceptors and electrically discontinuous particulate susceptors. In a matrix that contains electrically continuous particulate susceptors, the particles are in sufficiently close proximity to each other such that the matrix will conduct electricity. Heat is generated in the matrix by the interactions between adjacent particles, such as arcing and eddy currents.

Commonly used particulate materials for electrically continuous susceptors include carbon black, graphite, and finely divided metal particles. One such susceptor is described in U.S. Pat. No. 4,518,651, in which carbon black is loaded into a polymer matrix up to a level of 60% by weight carbon black. U.S. Pat. No. 4,640,838 discloses a self-venting, vapor-tight package suitable for use in a microwave oven having a deposit comprising non-metallic microwave-absorbing particles such as graphite dispersed in a non-metallic binder. When the package is heated in a microwave oven, heat build-up in the particles may soften and weaken the underlying packaging material, thereby venting the package. U.S. Pat. No. 3,701,872 discloses the incorporation of resistive particles within a body to be heated by microwave energy, such that a plurality of electric arcs are generated throughout the particles, thereby resulting in microwave energy being converted into heat energy. The disadvantages of electrically continuous susceptors include non-uniform heating, the possibility of catastrophic arcing, and difficulty in regulating the heating rate. Additionally, when metal particles are used, the level of loading that is required will result in a high density, and consequently a heavy susceptor.

Electrically discontinuous susceptors can comprise metal, semi-conductor, and/or ferromagnetic particles, which are dispersed or positioned in a matrix to be heated by microwave energy. The particles impart a lossy nature to the composite so that it can be heated by microwave energy. The absorption of microwave energy and the subsequent generation of heat occurs in isolated particles rather than through interactions of adjacent particles. These types of susceptors are described in, for example, U.S. Pat. Nos. 4,226,108; 4,362,917; and 4,450,334. Although these susceptors do not decline substantially in heat output and give fairly controllable heating, their disadvantages can include high density (heavy susceptor), high expense, and non-uniform dispersion.

U.S. Pat. No. 2,830,162 discloses that ferrite particles can be embedded in the material for making the body of a microwave browning dish to give the dish an upper temperature limit, resulting from the Curie effect. The Curie effect causes the microwave energy absorption capability of ferrite particles to vary with temperature. As the temperature increases, less microwave energy is absorbed, resulting in a lesser rise in temperature.

U.S. Pat. No. 3,585,258 discloses the use of divided iron or divided carbon as materials for converting microwave energy to heat energy for use in a microwave kiln to fire ceramic articles. According to this patent, the ceramic article to be fired is either placed near the divided material, filled with the divided material, or buried in the divided material.

Inorganic thin-film coatings, especially of metals, have long been applied to finely divided particulate matter for a variety of purposes. Materials for thin-film coatings are disclosed in U.S. Pat. No. 4,618,525.

SUMMARY OF THE INVENTION

In one aspect, this invention provides a composition comprising susceptors of microwave energy dispersed in a matrix substantially nonreflecting to microwave energy. The susceptors can comprise a substrate, in particulate form, made of material substantially non-reflective to microwave energy, said particulate substrate bearing a coating made of material capable of absorbing microwave energy and converting said energy to heat. Materials suitable for use as susceptors may be described as particles having a thin-film coating thereon. Preferred materials for the particulate substrates include glass and ceramics. Preferred thin-film coatings capable of absorbing microwave energy include electrically conductive materials and semi-conductive materials, such as metals and metal-containing compounds. The matrix can comprise polymeric and ceramic materials that are stable at temperatures conventionally used in microwave cooking. Materials for the matrix include silicones and silicone rubbers.

In another aspect, this invention provides a meltable susceptor comprising a meltable particulate substrate made of a material substantially non-reflective of microwave energy, said particulate substrate bearing a coating made of material capable of absorbing microwave energy and converting said energy to heat. The substrate can be a hot melt resin in particulate form. Upon being subjected to microwave energy, the resin will heat up, and the coating will become disrupted so that the hot melt portion can then flow and function as an adhesive.

In still another aspect of this invention, there is provided a method for microwave heating by subjecting the susceptors to microwave energy either as a portion of a composition in which the susceptors are incorporated into a matrix or as discrete susceptors.

The major advantages of this invention are the ability of the susceptors to be reused, elimination of decline in heating rate, elimination of arcing, capability of controllable heating, capability of forming lightweight compositions, capability for controlling overheating, and capability of forming microwave heatable composite materials with very low metal content.

DETAILED DESCRIPTION

Figure 1:
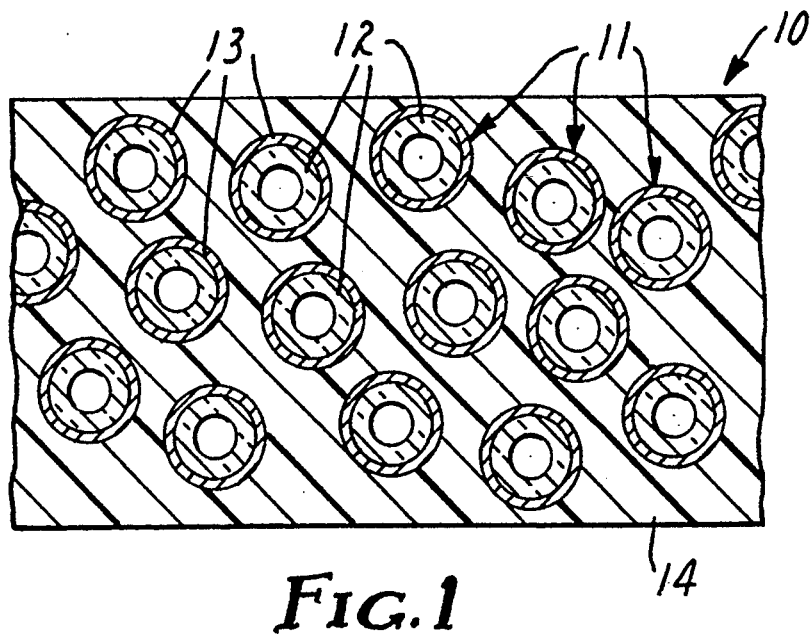
FIG. 1 shows a schematic view of a composite comprising a plurality of susceptors disposed in a matrix substantially non-reflective of microwave energy.

Referring now to FIG. 1, the present invention provides a composition comprising: (1) susceptors of microwave energy comprising a particulate substrate, e.g., an electrically insulative material in particulate form, bearing a thin coating, e.g., an electrically conductive inorganic film, and (2) a matrix that is substantially non-reflective of microwave energy, e.g., silicone rubber, which matrix can be heated upon the composite's being subjected to microwave energy.

In one embodiment of this invention, the susceptor can be characterized as a substrate in particulate form and bearing a thin coating thereon. The material from which the particulate substrate is formed can vary. Particulate substrates can be made of such materials as glass, ceramic, polymer, adhesive, or the like. Preferred materials are those that will neither conduct electricity nor reflect microwave energy. It is also preferred that these materials have sufficient strength to withstand processing conditions, such as, for example, compounding and extrusion. The surface of the particulate substrate is preferably continuous, so as to be able to receive and support a coating of a thin, continuous, conductive film or a thin, continuous, semi-conductive film. The shape of the particulate substrate can vary. Examples of useful shapes include spherical, spheroidal, ellipsoidal, granular, acicular, plates, flakes, and irregular and non-uniform from substrate to substrate. The particulate substrates can be solid or hollow. The dimensions of the particulate substrate can vary, but it is preferred that the major dimension be smaller than one centimeter, more preferably from 10 to 1,000 micrometers.

The material from which the coating for the particulate substrate is formed can vary. It is preferred that the coating have an electrical conductivity in the range that includes metallic conductors and semi-conductors, i.e., resistivity from $1 \times 10^{-6}$ ohm-cm to $1 \times 10^7$ ohm-cm. The coated particulate material will preferably have a bulk powder resistivity in the range of $1 \times 10^{-2}$ ohm-cm and $1 \times 10^8$ ohm-cm.

The bulk powder resistivity is measured in the following manner. A test cell is made of a hollow, nonconductive, plastic cylinder which is oriented vertically. It has an inner cross section of 1.0 cm². At its bottom is a brass disk which serves as a contact electrode. A second brass electrode, in rod form, slides into the cylinder from its top. Both electrodes have a contact area (A) of 1.0 cm². The powder to be tested is placed between the electrodes, with a powder bed height (h) of 1.0 cm. A mass of 1.3 kilograms is placed on the upper electrode which causes a pressure of 127 kilopascals to be exerted on the powder bed. The resistance (R) between the two electrodes is measured with an ohmmeter. The bulk powder resistivity (P) is calculated from the equation P = R A/h, and is given in units of ohm-cm.

Inorganic materials suitable for coating the particulate substrate include metals such as, for example, tungsten, zirconium, copper, iron, titanium, chromium, silver, molybdenum, and aluminum, or compounds which have fairly high electrical conductivities, such as, for example, metal oxides, nitrides, carbides, silicides, borides, and phosphides. Other compounds suitable for the coatings of the particulate substrates of the particles of this invention include titanium nitride, titanium carbide, vanadium suboxide, and molybdenum disilicide.

Coatings that are suitable for the particulate substrates useful in this invention are preferably very thin. The coatings must be sufficiently thick to form a continuous coating and to impart a high degree of electrical conductivity to the coated particle, yet not be so thick as to induce excessive reflection of microwave radiation. The thickness of the coating can range from about 1 to about 10,000 Angstroms, preferably from about 1 to about 1,000 Angstroms and, most preferably, from about 1 to about 100 Angstroms. For example, very thin tungsten coatings, e.g., in the range of 5 to 50 Angstroms in thickness, provide particles having bulk powder conductivity of intermediate value and are able to convert microwave energy to heat efficiently in a microwave oven. On the other hand, thick tungsten coatings, e.g., over 100 Angstroms thick, provide particles having very high bulk powder conductivity, and such particles would be expected to induce excessive reflection of microwave energy. As a general rule, above a certain minimum thickness, as the thickness of the tungsten coating increases, the less efficiently the particle bearing the coating converts microwave energy to heat.

The heating efficiency of the susceptor is also dependent upon the conductivity of the coating. The heating efficiency at higher temperatures can be reduced by changing this conductivity. This change can be brought about by partial oxidation of the coating at elevated temperatures, thereby lowering the conductivity, and, consequently reducing heating efficiency. Alternatively, this change can be brought about by using a coating whose conductivity varies with temperature. Coatings whose conductivity varies with temperature include semi-conductive coatings and some ultra-thin metallic coatings. The conductivity of the coating can rise with temperature, thereby rendering the coating too conductive and less effective in absorbing microwave energy. The foregoing methods of reducing heating efficiency at elevated temperatures provide a self-limiting or self-regulating feature which can prevent overheating of the susceptors.

The susceptors useful in this invention can be very low in weight. A thin coating of tungsten on a glass microbubble having a given diameter will weigh much less than a solid particle of tungsten having the same diameter. The particles of this invention can be much more transparent to X-rays and visible radiation than are solid metal powders. It has also been found that certain needle-shaped or flat non-metallic substrates, e.g., flakes, though solid, can still have lower weight than solid metal particles. In addition, flat coated particles, such as tungsten-coated mica flakes, heat more effectively than do coated microbubbles; accordingly lower volume loadings can be used.

Material to be heated by the susceptors of this invention, i.e., material forming the matrix, must be substantially non-reflective of microwave energy, that is, capable of transmitting microwave energy. These materials can be solids, including powders, liquids, or gases. The susceptors can be mixed with the heatable materials.

The susceptors can be used in a number of different ways including incorporating them into a matrix such as a thin polymeric sheet or a ceramic dish; adding them to a liquid polymeric material wherein the material can be cured or polymerized in a microwave oven; admixing them with a hot melt powder or hot melt particles and using microwave energy to melt the composition.

If coated microbubbles are used as the susceptors in a hot melt powder matrix, the microbubbles will impart light weight character to the composite to form a foamed or syntactic-foam-like adhesive.

Hot melt adhesives admixed with susceptors can be applied to an article by coating the mixture on the surface of an article to be bonded, as for example, a package, and after the contents are inserted in the package, the whole assembly can be placed in a microwave oven with the edges to be sealed held in place during the heating process. Another use of these mixtures is in hot melt glue guns wherein the glue gun is placed in a microwave oven until the adhesive mixture is soft, whereupon the desired amount of adhesive can be applied to an object.

Figure 2:
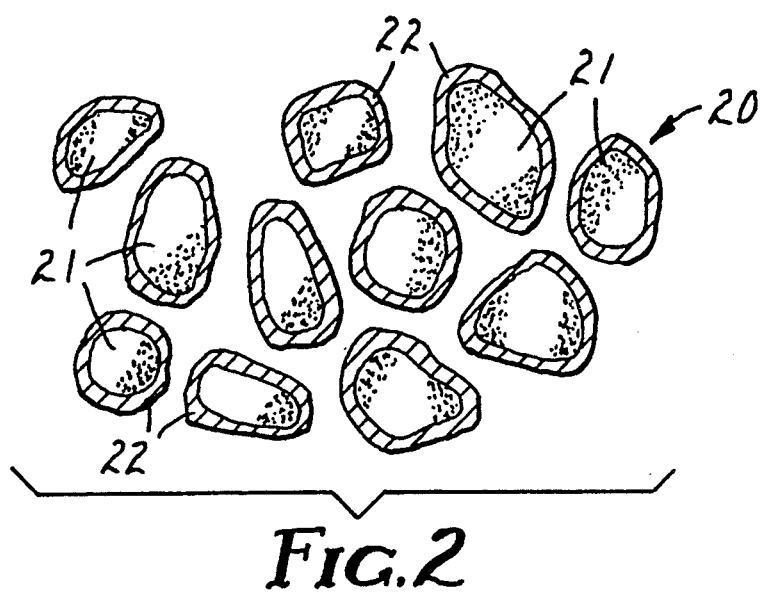
FIG. 2 shows a schematic view of a plurality of susceptors comprising particles of a hot melt adhesive bearing a coating of an electrically conductive material on the surface thereof.

In another aspect of this invention, hot melt adhesive particles themselves can be used as the particulate substrate of the susceptor. The hot melt particles can be directly coated with the thin-film coating (rather than coating bubbles, which are then added to the hot-melt matrix). This is illustrated in FIG. 2. When heated by microwave energy, the adhesive particles melt, flow into contact with other adhesive particles, and then cool to form a solid adhesive mass. The volume of metal present is very small so that almost 100% of the mass is adhesive. The cohesive strength will be close to that of the hot melt adhesive which contains no added particles. A suitable hot melt adhesive powder is "Eastobond" FA 300, available from Eastman Chemical Products, Kingsport, Tenn.

A number of advantages can be cited for the articles and the method of the present invention. With substrates comprising coated spherical or spheroidal particles, there is no arcing, as there could be if carbon particles were used as susceptors. Susceptors having acicular or irregular shapes can have sharp points, which could lead to high electric field concentration, and consequently a potential for arcing. The susceptors can be tuned for absorption at different frequencies by changing the thin-film coating thickness and, as a consequence, the susceptor's conductivity. This tuning allows them to be used in both industrial and consumer microwave ovens operating at different frequencies. The heating efficiency can also be controlled by controlling either the percentage of susceptors in the composition or the thickness of the composition or both. The susceptors can be re-heated when used in a thin sheet; efficient re-heating is not possible with some conventional, thin-film susceptors vapor coated with thin metal films. In certain applications, the thin-film coating on the particulate substrates of the susceptors can be made to partially oxidize if the temperature of their environment gets too high, thereby slowing the heating and preventing catastrophic overheating. Another method for preventing catastrophic overheating is to use susceptors having thin-film coatings that change conductivity with temperature. At lower temperatures, the susceptors will heat efficiently because the conductivity is optimum, but at higher temperatures, the higher conductivity will give poor heating efficiency. The susceptors can be custom designed to suit the application. For example, the susceptors can be made spherical in a size ranging from 10 to 1,000 micrometers so that they can be easily dispersed in a liquid resin. The susceptors can employ a substrate of hollow microbubbles to impart a light-weight, foam-like characteristic to the cured matrix. As another example, the outer portion of the coating of the susceptor can be caused to oxidize sufficiently to change the conductivity of the outer portion to alter the heating efficiency of the susceptor.

The following examples serve to further illustrate the invention and should not be construed so as to limit the scope of the appended claims.

The susceptors to be used in the examples were prepared as described below and a summary of the conditions of preparation and the properties of the susceptors are given in TABLE I. Each of the preparation conditions can be ascertained from the table and will not be given in the following descriptions.

Preparation of Susceptors

Susceptors A, B, C, D

Glass microbubbles (C15/250, Minnesota Mining and Manufacturing Co., St. Paul, Minn.) having an average density of 0.15 g/cc and an average diameter of 50–70 micrometers were tumbled in a vacuum chamber while being sputter coated with tungsten vapor. The tungsten target was a rectangular cathode (12.7 cm by 20.3 cm). The apparatus was operated for various durations in the direct current planar magnetron mode at an applied power of 0.75 to 0.80 kw. The argon sputtering gas pressure was 4 millitorr, and the background pressure was about $1 \times 10^{-5}$ torr. The coated bubbles had a dark gray color. The thickness of the tungsten coating was calculated for each of the particles.

Susceptor E

Glass microbubbles (C15/250, 100 ml) were coated with silver by tumbling in a vacuum chamber with a 2.25 inch TriMag source available from L. M. Simard, Santa Barbara, Calif. The operating conditions included a plasma current of 5 amperes, a cathode potential of 120 volts, and a cathode current of 0.22 ampere. No permanent magnet assist was used.

Susceptor F

Glass microbubbles (B23/500, 100 ml, Minnesota Mining and Manufacturing Company) having an average density of 0.23 g/cc and an average diameter of 50–70 micrometers were coated with silver in the chamber used to prepare susceptor A.

Susceptor G

Glass microbubbles (C15/250, 100 ml) were coated with chromium in the chamber used to prepare susceptor A.

Susceptor H

Glass microbubbles (C15/250, 100 ml) were coated with zirconium in the chamber used to prepare susceptor A.

Susceptor I

Barium titanate glass microbeads, as described in U.S Pat. No. 4,025,159 (150 ml), having an average density of 4.5 g/cc and an average diameter of 71 micrometers, were coated with TiN by tumbling in a vacuum chamber with a cathodic arc apparatus similar to that described in Proc. IEEE, Vol. 60,(8), p. 977, 1972. A water cooled titanium cathode having a 2-inch diameter circular face, a thickness of 0.75 inch, surrounded by a circular ring of boron nitride, was used to generate a plasma using a potential of 60 volts at 110 amperes discharge current. This ionized titanium plasma stream, which was normal to the cathode surface, was focused by a magnetic field of approximately 100 gauss. The apparatus utilized an isolated anode in the shape of a ring. Nitrogen gas was added to the chamber at a rate of 40 SCCM during deposition to form a titanium nitride coating on the microbeads.

Susceptor J

Ceramic fibers ("Nextel" 440, Minnesota Mining and Manufacturing Company, 15 ml) having an average diameter of 8-10 micrometers, were chopped with a razor blade to yield fibers with an aspect ratio distribution over the range of 1 to 40. These fibers were then sputter coated with tungsten in the chamber used to prepare susceptor A.

Susceptor K

Hot melt adhesive particles (medium powder, 250 ml, Eastobond FA 300, Eastman Chemical Products, Inc., Kingsport, Tenn.) having a melt temperature of about 210° C., were sputter coated with tungsten in the chamber used to prepare susceptor A.

Susceptors L, M, P,

Glass microbubbles (S60/10000, Minnesota Mining and Manufacturing Co., 2000 ml), having an average density of 0.53 g/cc and being of a size which would not pass through a 400 mesh sieve, were coated with tungsten in the chamber used to prepare susceptor A.

Susceptor N

Glass microbubbles (S60/10000, Minnesota Mining and Manufacturing Co., 2000 ml) having an average density of 0.60 g/cc and an average diameter of about 50 micrometers were coated with tungsten in the chamber used to prepare susceptor A.

Susceptor P

Tungsten coated bubbles of susceptor N were coated with aluminum oxide in the chamber used to prepare susceptor A, with the following modifications. An aluminum sputtering target was used in place of the tungsten target. Oxygen was added to the chamber in the vicinity of the particles at a rate of 4.0 cc/min. This procedure provided an insulating coating made of oxidized aluminum.

Susceptor Q

Glass microbubbles (C15/250, 100 ml) were coated with vanadium suboxide while being tumbled in a vacuum chamber. The coating procedure was carried out for 2 hours and 48 minutes by depositing vanadium by means of the TriMag apparatus described for coated susceptor E. The plasma current was 7.7–8.1 amperes with a cathode potential of 950 volts and a cathode current of 1.00 ampere. Oxygen was added to the chamber in the vicinity of the microbubbles at a rate of 5.0 cc/min during the vanadium deposition to provide a vanadium suboxide composition capable of yielding conductivity that varies with temperature.

Susceptor R

Glass microbubbles (S60/10000, 200 ml), of a size which would not pass through a 400 mesh sieve, were coated with molybdenum disilicide in the apparatus used to prepare susceptor A, with the following modifications. A molybdenum disilicide sputtering target obtained from Cerac Incorporated, Milwaukee, Wis. was used. A portion of the coated bubbles was then heated in air at 400° C. for 2 hours. This oxidizes the outer portion of the coating, and renders the surface passive to further oxidation, thereby making the coating more stable to oxidation during storage and heating. Oxidizing the outer portion of the coating decreases the thickness of the conductive portion of the coating, rendering the susceptor more efficient.

Susceptor S

Mica flakes (Suzorite mica 200 HK, Marietta Resources International Ltd.) were sputter-coated with tungsten. The tungsten-coated flakes were then coated with aluminum oxide in the chamber used to prepare susceptor A.

TABLE I summarizes the method of preparation and the characteristics of the susceptors:

The thickness of the coating on a spherical particle is calculated from the weight percent of the coating using the following equation:

$$t = 100 \, W/DS$$

where
- $t$ represents tile thickness of the coating in Angstroms,
- $W$ represents the weight percent of the coating on the particle, based on total weight of the particle
- $D$ represents the density of the coating in g/cc, and
- $S$ represents the average surface area of the particles in $m^2/g$.

The value of $W$ can be determined by dissolving the coating in a mixture comprising dilute hydrofluoric acid in combination with other acids, for example, nitric, sulfuric, and hydrochloric acids. The solution is then analyzed by the technique of Inductively Coupled Argon Plasma Atomic Emission Spectroscopy, as described in M. Thompson and J. Walsh, *Handbook of Inductively Coupled Plasma Spectrometry*, Chapman and Hall, 1983.

The average surface area of the particles can be determined using the Brunauer, Emmett, Teller method (BET), as described in T. Allen, *Particle Size Measurement*, 3rd edition, Chapman and Hall, 1981.

TABLE I

| Susceptor | Metal coat/substrate[1] | Batch size (ml) | Applied power (kw) | Deposit rate (Å/min) | Coating time (min) | Wt % metal | Calc. thick. (Å) |
|---|---|---|---|---|---|---|---|
| A | W/bbl | 150 | 0.75 | 1200 | 30 | 2.8 | 7 |
| B | W/bbl | 150 | 0.75 | 1200 | 61 | 4.8 | 11 |

TABLE I-continued

| Suscep-tor | Metal coat/sub-strate[1] | Batch size (ml) | Applied power (kw) | Deposit rate (Å/min) | Coating time (min) | Wt % metal | Calc. thick. (Å) |
| --- | --- | --- | --- | --- | --- | --- | --- |
| C | W/bbl | 150 | 0.75 | 1200 | 91 | 9.0 | 20 |
| D | W/bbl | 2000 | 1–2.25 | 1500–2800 | 451 | 19.3 | 150 |
| E | Ag/bbl | 100 | 0.026 | 1800 | 60 | 2.3 | 26 |
| F | Ag/bbl | 100 | 1.0 | 6600 | 60 | 18.3 | 530 |
| G | Cr/bbl | 100 | 0.75 | 1550 | 33 | 1.75 | 29 |
| H | Zr/bbl | 100 | 0.50 | 1700 | 30 | 1.79 | 26 |
| I | TiN/bd | 150 | 6.6 | 12000 | 60 | 2.7 | 1700 |
| J | W/fbr | 15 | 4.5 | 2700 | 141 | 6.78 | 130 |
| K | W/hma | 250 | 0.90 | 600 | 60 | 0.43 | 20 |
| L | W/bbl | 2000 | 0.67 | 1000 | 120 | 0.49 | 6 |
| M | W/bbl | 2000 | 1.10 | 1500 | 120 | 0.83 | 9 |
| N | W/bbl | 2000 | 5.00 | 3000 | 80 | 1.23 | 9 |
| O | W/bbl | 2000 | 1.50 | 2100 | 120 | 1.04 | 12 |
| P | $AlO_x$/W/bbl | 200 | 2.00 | 3200 | 120 | 1.23 | 67/9[2] |
| Q | $VO_2$/bbl | 100 | 0.76 | 1460 | 168 | 6.93 | 120 |
| R | $MoSi_2$/bbl | 200 | 1.25 | 1650 | 120 | 0.73 | 40 |
| S | $AlO_x$/W/fl | 1000 | 1.20 | 1650 | 183 | 1.73 | 15/3.2[3] |

[1]bbl = glass bubble
bd = glass bead
hma = hot melt adhesive
fbr = ceramic fiber
fl = flake

[2]Susceptor P: Thickness of aluminum suboxide coat was 67Å. This value was estimated from coating run parameters. Coating run parameters are for $AlO_x$. Thickness of tungsten coat was 9Å. Wt % metal refers to tungsten portion of coating.

[3]Susceptor S: Thickness of aluminum suboxide coat was 15Å. This value was estimated from coating run parameters. Coating run parameters are for $AlO_x$. Thickness of tungsten coat was 3.2Å. Wt % metal refers to tungsten portion of coating.

EXAMPLES 1–15 AND COMPARATIVE EXAMPLES X1, X2, X3

In Examples 1 through 15, and Comparative Examples X1 and X2 set forth below, the susceptors described previously were introduced into and thoroughly mixed with various matrices. In Examples 1–11, and Comparative Examples X1 and X2, the matrix was an epoxy (5-minute epoxy) having the trade designation 14210 or 14250, available from Dercon Corp., Danvets, Mass. In Examples 12a and 12b, the matrix was silicone rubber (room temperature vulcanizing silicone) having the trade designation RTV 615, available from General Electric Company, Waterford, N.Y. In Example 13, the matrix was plaster of Paris formulated with 2.43 grams of plaster of Paris mixed with 2.21 g of water. Example X1 did not include a coated particle but a standard NiZn ferrite powder obtained from Titan Corp., Valparaiso, Ind. The mixtures were formed into test coupons for further heating tests in a microwave oven. The test coupons were 2.5 cm by 2.5 cm, some being self supporting and some being supported by glass slides.

In TABLE II, particle loading is expressed as both percentage by weight and percentage by volume of the susceptors in the matrix material. The sample thickness shown is the final thickness after curing or drying of the matrix mixture.

The surface temperature of each test coupon was measured while the sample was being heated in a "Litton Generation II" microwave oven operating at full power of 700 watts at a frequency of 2.45 GHz. The temperature was measured with a temperature probe placed in contact with the top surface of the test coupon. The probe was a Luxtron model MEL coupled to a model 750 Fluoroptic Thermometry System, manufactured by Luxtron, Mountain View, Calif.

The surface heating rate was calculated as the rise in surface temperature divided by the time of heating and is related to the efficiency of the conversion of microwave energy to heat energy by the susceptor/matrix mixture.

TABLE II

| Ex no. | Susceptor | Metal coat/ substrate | Calc. thick. (Å) | Particle loading wt % | Particle loading vol % | Sample thickness (Mm) | Rise in Surface temp (°C. in 15 sec) | Heating rate (°C./min) |
| --- | --- | --- | --- | --- | --- | --- | --- | --- |
| 1 | A | W/bbl | 7 | 16 | 60 | 1.5 | 249 | 996 |
| 2 | B | W/bbl | 11 | 16 | 60 | 1.6 | 203 | 812 |
| 3 | C | W/bbl | 20 | 16 | 60 | 1.6 | 174 | 696 |
| 4 | D | W/bbl | 150 | 16 | 56 | 1.5 | 112 | 448 |
| 5 | G | Cr/bbl | 29 | 15 | 64 | 1.7 | 173 | 692 |
| 6 | H | Zr/bbl | 26 | 12 | 60 | 1.5 | 52 | 208 |
| 7 | F | Ag/bbl | 530 | 16 | 51 | 1.5 | 101 | 404 |
| 8 | E | Ag/bbl | 26 | 15 | 60 | 1.5 | 6 | 24 |
| 9 | K | W/hma | 20 | 50 | 49 | 1.6 | 93 | 372 |
| 10 | I | TiN/bd | 1700 | 86 | 61 | 1.8 | 63 | 252 |
| 11 | J | W/fbr | 130 | 50 | 27 | 1.5 | 258 | 1032 |
| 12a | R[1] | $MoSi_2$/bbl | 40 | 44 | 60 | 1.2 | 136 | 544 |
| 12b | R[2] | $MoSi_2$/bbl | 40 | 44 | 60 | 1.2 | 158 | 632 |
| 13 | B | W/bbl | 11 | 16 | 56 | 2.6 | 132 | 528 |
| X1 | NZ[3] | | | 86 | 57 | 1.6 | 85 | 340 |
| X2 | GM[4] | | | 16 | 60 | 1.6 | 10 | 40 |

TABLE II-continued

| Ex no. | Susceptor | Metal coat/ substrate | Calc. thick. (Å) | Particle loading wt % | Particle loading vol % | Sample thickness (Mm) | Rise in Surface temp (°C. in 15 sec) | Heating rate (°C./min) |
|---|---|---|---|---|---|---|---|---|
| X3 | | AP[5] | | | | | 157 | 628 |

[1]Susceptor is not heat treated
[2]Susceptor is heat treated for two hours at 400° C. in air.
[3]NZ = NiZn ferrite powder from Titan Corp.
[4]GM = uncoated C15/250 glass microbubbles
[5]AP = Aluminized polyester heater used in Act II popcorn package (Golden Valley Microwave Foods, Inc., Hopkins, Minnesota)

Examples 1–3 illustrate that very thin coatings of tungsten that form a continuous coating on the surface of the particulate substrate and impart bulk conductivity to the susceptor are efficient energy converters and that heating efficiency is dependent upon coating thickness, with heating efficiency decreasing with increasing coating thickness.

Example 4 illustrates that a large increase in the coating thickness of tungsten decreases the heating efficiency of the susceptor.

Examples 5 and 6 illustrate that metal coatings other than tungsten are useful as coatings for susceptors.

Example 7 illustrates that a heavy coating of silver, which does uniformly coat the surface of the particulate substrate, provides bulk conductivity to the mixture and can be used as a coating for a susceptor. Heavy coatings increase both the weight and the cost of the susceptor.

Example 8 illustrates that a thin coating of silver, which does not uniformly coat the surface of the particulate substrate but rather exists as discrete silver deposits on the surface, does not have good bulk conductivity, and, consequently, results in a poor susceptor.

Example 9 illustrates that hot melt adhesive particles can be directly coated to form a susceptor, thereby avoiding the addition of a large volume of filler materials to the matrix.

Example 10 illustrates the use of a metal nitride as a coating for a susceptor and the use of a bead as a particulate substrate.

Example 11 illustrates the use of a different shape and different particulate substrate for the susceptor. The acicular shape brings about the large increase in heating efficiency, even though the coating is relatively thick for a tungsten coating.

Examples 12a and 12b illustrate the use of a metal disilicide as a coating for a susceptor. The use of a subsequent heat treatment is also shown.

Example 13 illustrates the use of the susceptors in an inorganic matrix material, namely an inorganic binder of plaster of Paris.

Comparative Example X1 illustrates that commercially available ferrite materials are of the same heating efficiency as the materials of this invention at the same volume loading. However, the weight percent loading of this material is higher than that of the coated microbubble susceptors of this invention.

Comparative Example X2 illustrates that uncoated microbubbles useful as particulate substrates have a low heating efficiency compared to coated microbubbles useful in this invention.

Comparative Example X3 illustrates the efficiency of a susceptor comprising a thin metal coating. The susceptor comprises a 100 Å coating of aluminum on a particulate substrate made of polyester. It has a heating efficiency similar to that of the susceptors useful in this invention.

EXAMPLE 14

Tungsten-coated glass microbubbles (1.5 g, coated susceptor A) were mixed with 10.35 g powdered adhesive (Macromelt 6239, Henkel Corp., Minneapolis, Minn.). The mixture was heated to 175° C., at which temperature the adhesive melted. The molten mixture was then allowed to cool, thereby providing a solid bubble-filled, hot melt adhesive composition. A 1 cm'1 cm×1.4 mm piece of the solid composition was placed between two 1 inch×3 inch glass microscope slides, and the resulting structure was heated in a "Litton Generation II" 700 watt microwave oven at full power for 30 seconds. The adhesive melted, bonding the two glass slides. A similar test with uncoated bubbles produced no melting of the solid adhesive composition while it was in the activated microwave oven.

EXAMPLE 15

Powdered adhesive particles (0.15 g, Eastobond FA300 Hot Melt Adhesive Powder, Eastman Chemical Products, Kingsport, Tenn.) coated with tungsten (coated susceptor K) were placed between two 1 inch×3 inch glass microscope slides and the resulting structure placed in a "Litton Generation II" 700 watt microwave oven. The structure was heated for 40 seconds at full power. The adhesive particles melted and bonded the slides. The slides were debonded by heating for 40 seconds. A similar test with uncoated powdered adhesive particles showed no melting or bonding. The weight percent of tungsten in the melt was determined to be 0.25%. This corresponds to a volume loading of 0.01%.

EXAMPLE 16

Tungsten coated glass microbubbles (coated susceptor L) were mixed with silicone rubber (RTV 615) at a bubble volume loading of 60%. The mixture was formed into a sample having dimensions of 1 cm×1 cm×0.3 cm. This slab was heated for 10 minutes in a 700 watt "Litton Generation II" microwave oven at a power setting of 30% of total power. The temperature of the center of the sample rose rapidly, then stabilized. The temperature was approximately 90° C. after two minutes of heating and reached 100° C. at the end of a 10 minute heating period. The heating cycle was repeated and the same steady state temperature was reached. This example illustrates that the susceptors of this invention can be re-used.

COMPARATIVE EXAMPLE X4

A 4 inch square "Act II" Microwave Popcorn bag susceptor was heated for 30 seconds in a "Litton Generation II" 700 watt microwave oven at full power. The temperature of the susceptor was monitored with a Luxtron MEL surface temperature probe placed on the center of the sample. The temperature after 30 seconds was 202° C. The sample was allowed to cool. It was heated again for 30 seconds. This time the temperature was only 126° C. This example illustrates that the thin-film susceptors quickly degrade so that they cannot be reused to provide the same temperature.

EXAMPLE 17

A sample was prepared in the same manner as was the sample in Example 16 and heated for 10 minutes in a 700 watt microwave oven at a setting of 100% total power. The temperature rose to 212° C. in 1.3 minutes, then decreased to 188° C., where it remained constant until the end of the 10 minute heating period. This decrease in heating efficiency at high temperature illustrates how the coating of the susceptor will partially oxidize to compensate for an oven setting that is too high.

EXAMPLE 18

Tungsten coated glass microbubbles (coated susceptor O) were mixed with silicone rubber (RTV 615) at a bubble volume loading of 50%. The mixture was divided into three equal portions. One portion of this mixture was used to fill a cylindrical mold that was 9.7 cm in diameter and 0.70 cm deep. The mold was centered on the floor of a "Litton Generation II" 700 watt microwave oven. The oven was turned on full power for 30 seconds. The mixture was allowed to cool and the solidified mixture then removed from the mold. The mixture was completely cured, as evidenced by the fact that it had solidified and was no longer tacky.

A second portion of the mixture was allowed to stand at room temperature. This portion had not cured after four hours, and the expected cure time was 24 hours.

A third portion of the mixture was placed in a mold identical to the first mold. The mold was placed in a conventional oven set at a temperature of 200° C. After 2.5 minutes, the mixture was still uncured in the center. At 3.5 minutes it was fully cured. This example illustrates that the susceptors of this invention can be used to cure polymers at a higher rate of speed than is possible with conventional techniques.

EXAMPLE 19

Aluminum oxide/tungsten coated microbubbles (coated susceptor P) were mixed with silicone rubber (RTV 615) at a bubble volume loading of 50%. This mixture was poured into a mold which consisted of a small beaker inside of a larger beaker. The mixture was allowed to stand for one hour at 90° C. whereupon it solidified. The cured composite formed a cup having walls 4–5 mm thick, a diameter of 6 cm, and a height of 8.5 cm. A similar cup was made using uncoated microbubbles.

Mineral oil (100 g) was placed in each cup. The filled cups were then heated in a "Litton Generation II" 700 watt microwave oven at full power. The temperature rise of the mineral oil was measured. After 46 seconds of heating, the temperature of the mineral oil in the cup with the coated bubbles had risen by 35° C. The mineral oil in the cup with the uncoated bubbles had risen by only 6° C. This example illustrates that liquids that cannot normally be heated efficiently in a microwave oven can be heated in a microwave oven through the use of the susceptors described herein.

EXAMPLE 20

Vanadium suboxide coated microbubbles (coated susceptor Q) were mixed with epoxy resin (5 minute "Devcon") at a bubble volume loading of 50%. The mixture was then formed into a one inch square coupon having a thickness of 1 mm. The surface temperature of the slab during microwave heating was measured with a Luxtron MEL probe. A correction was made for heat loss from the sample during the heating process by subtracting the independently determined cooling rate. When the surface temperature reached 90° C., the heating rate was 27° C./sec. When the surface temperature reached 220° C., the heating rate dropped to 19° C./sec. This decrease in the heating rate reduced the rate at which the sample heated as it reached elevated temperatures. This example illustrates that a semi-conductive coating can be used to prevent overheating of the matrix. This example illustrates that a coating whose conductivity changes with temperature (i.e., a semi-conductor) can be used to limit the rate of heating at elevated temperatures.

EXAMPLE 21

Tungsten coated glass microbubbles (coated susceptor O) were mixed with silicone rubber (RTV 615) at a bubble volume loading of 50%. The mixture was formed into a sheet 2 mm thick and allowed to cure overnight. A "Pillsbury" Buttermilk Biscuit (Pillsbury Co., Minneapolis, Minn.) was placed on a 2½ inch diameter area of the sheet, then heated at full power in a "Kenmore" 700 watt microwave oven for 1 minute and 30 seconds. The bottom of the biscuit was very brown. A biscuit cooked in the same manner using a sheet containing no susceptor showed no browning. This example illustrates that coated susceptors can be used to brown food products.

EXAMPLE 22

Tungsten coated glass microbubbles (coated susceptor N) were mixed with silicone rubber (RTV 615) at a volume loading of 60%. Test coupons one inch square were made from this mixture. The coupons were made at thicknesses of 1.20, 1.70, 1.98, and 2.85 mm. The coupons were heated 15 seconds in a "Litton Generation II" 700 watt microwave oven at full power. The temperature of the center of each coupon was measured with a Luxtron surface temperature probe. Temperatures were 177° C., 193° C., 203° C., and 208° C., respectively after 15 seconds. The temperature, and rate of heating increases with coupon thickness. This example illustrates that the surface temperature can be controlled by controlling the thickness of the sample.

EXAMPLE 23

Tungsten coated glass microbubbles (coated susceptor M) were mixed with silicone rubber (RTV 615) at several different microbubble loadings. The microbubble loadings were 36, 50, and 60 volume percent. The mixtures were formed into one inch square coupons having an average thickness of 1.6 mm. The coupons were heated in a "Litton Generation II" 700 watt microwave oven for 15 seconds at full power. The temperature of the center of each sample was determined with a Luxtron MEL surface temperature probe. The heating rates were found to be 4.5°, 8.6°, and 10.3° C./sec. Both rate of heating and temperature increase with microbubble loading. A coupon containing 50% by volume of uncoated bubbles showed no apparent temperature increase. This example illustrates that the surface temperature can be controlled by controlling the susceptor loading in the sample.

EXAMPLE 24

A mixture of 55 grams of silicone liquid (Dow Corning DC-704) and 13 grams of tungsten coated glass microbubbles (coated susceptor M) was sealed in a plastic bag. The mixture was heated for 20 seconds at full power in a "Litton Generation II" 700 watt microwave oven. The bag became hot to the touch and remained so for several minutes. A thermometer wrapped in this bag reached a temperature of 88° C. A bag containing the same weight of water was heated in the same manner. In this case, a thermometer wrapped in the bag only reached a temperature of 59° C. This example demonstrates that the coated bubbles can be dispersed in a liquid matrix to achieve a material heatable by microwave energy. Such material could then function as the heater in a hot pad. Unlike using water as the susceptor material, the heating rate or ultimate temperature can be controlled by adjusting the loading of coated susceptors.

EXAMPLE 25

Example 24 was repeated with the exception that a silicone grease was used as the binder. The bag again became hot to the touch after heating in a microwave oven. Use of grease, rather than oil, has the advantage that any leaks that form are more easily controlled and the bubbles will remain uniformly dispersed longer.

EXAMPLE 26

The procedure of Examples 1-11 was repeated, with the only exception being that susceptor S was used. The following data was obtained:

| Particle loading | 54% by weight |
| --- | --- |
|  | 20% by volume |
| Sample thickness | 2.0 mm |
| Rise in surface temperature | 300° C. in 15 seconds |
| Heating rate | 1200° C. per minute |

Various modifications and alternatives of this invention will become apparent to those skilled in the art without departing from the scope and spirit of this invention, and it should be understood that this invention is not to be unduly limited to the illustrative embodiments set forth herein.

What is claimed is:

1. An article comprising a flowable meltable particle being spheroidal, rod-like or acicular in shape and having a surface, said surface bearing a coating having an electrical resistivity from $1\times10^{-6}$ Ohm-cm to $1\times10^7$ Ohm-cm which absorbs sufficient microwave energy to cause said particle to melt and flow.

2. The article of claim 1, wherein said particle is a hot melt adhesive.

3. The article of claim 1, wherein said particle is substantially non-reflective of microwave energy.

4. The article of claim 1, wherein said coating is electrically conductive.

5. The article of claim 1, wherein said coating is semi-conductive.

6. The article of claim 1, wherein said coating is inorganic.

7. The article of claim 1, wherein said particle has a regular geometric shape.

8. Method of preparing a hot melt adhesive capable of being heated by microwave energy comprising the steps of:
   (a) preparing susceptors comprising a particle substantially non-reflective of microwave energy, said particle bearing a thin, electrically conductive coating, said coating having a electrical resistivity from $1\times10^{-6}$ Ohm-cm to $1\times10^7$ Ohm-cm which absorbs microwave energy, and
   (b) incorporating the susceptors into a hot-melt adhesive matrix.

9. Method of preparing a susceptor having a capability of absorbing microwave energy, said susceptor comprising a particle substantially non-reflective of microwave energy and a coating capable of absorbing microwave energy comprising the steps of:
   (a) providing a particle substantially non-reflective of microwave energy,
   (b) applying a coating having an electrical resistivity from $1\times10^{-6}$ Ohm-cm to $1\times10^7$ Ohm-cm which absorbs microwave energy over said particle, said coating having an outer portion, and
   (c) causing the outer portion of said coating to oxidize sufficiently to change the electrical conductivity of said outer portion of said coating.

* * * * *

UNITED STATES PATENT AND TRADEMARK OFFICE
CERTIFICATE OF CORRECTION

PATENT NO. : 5,446,270
DATED : August 29, 1995
INVENTOR(S) : Craig S. Chamberlain et al.

It is certified that error appears in the above-indentified patent and that said Letters Patent is hereby corrected as shown below:

Col. 8, line 43       "tile" should read -- the --

Col. 9, line 38       "Dercon" should read -- Devcon -- and

"Danvets," should read -- Danvers. --

Col. 12, line 24      "cm'1" should read -- cm × 1 --

Signed and Sealed this

Fourteenth Day of November, 1995

*Attest:*

BRUCE LEHMAN

*Attesting Officer*    *Commissioner of Patents and Trademarks*